(12) United States Patent
Wang et al.

(10) Patent No.: US 8,610,900 B2
(45) Date of Patent: Dec. 17, 2013

(54) APPARATUS FOR LOW COHERENCE OPTICAL IMAGING

(71) Applicant: National Taiwan University, Taipei (TW)

(72) Inventors: Yu-Ta Wang, Taipei (TW); Po-Kai Hsu, Taipei (TW); Sheng-Lung Huang, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 13/715,269

(22) Filed: Dec. 14, 2012

(65) Prior Publication Data

US 2013/0100457 A1    Apr. 25, 2013

Related U.S. Application Data

(62) Division of application No. 12/841,745, filed on Jul. 22, 2010.

(30) Foreign Application Priority Data

Mar. 29, 2010 (TW) .............................. 99109291 A

(51) Int. Cl.
*G01B 11/02* (2006.01)

(52) U.S. Cl.
USPC ........................................................ 356/497

(58) Field of Classification Search
USPC .......................................... 356/456, 479, 497
See application file for complete search history.

(56) References Cited

U.S. PATENT DOCUMENTS

| | | | |
|---|---|---|---|
| 5,299,170 A * | 3/1994 | Shibata et al. ................ | 356/491 |
| 5,489,984 A | 2/1996 | Hariharan et al. | |
| 5,579,112 A | 11/1996 | Sugiyama et al. | |
| 6,069,698 A | 5/2000 | Ozawa et al. | |
| 6,597,446 B2 | 7/2003 | Klooster et al. | |
| 6,956,653 B1 * | 10/2005 | Lam et al. ..................... | 356/477 |
| 7,236,251 B2 | 6/2007 | Takaoka | |
| 7,242,833 B2 | 7/2007 | Yang et al. | |
| 7,259,869 B2 * | 8/2007 | Hwang et al. ................. | 356/511 |
| 7,460,248 B2 | 12/2008 | Kurtz et al. | |
| 7,929,144 B1 | 4/2011 | Polzin et al. | |
| 8,054,468 B2 * | 11/2011 | de Boer et al. ............... | 356/479 |
| 2006/0244972 A1 | 11/2006 | Fercher | |
| 2008/0100848 A1 * | 5/2008 | Kobayashi .................... | 356/497 |

FOREIGN PATENT DOCUMENTS

EP    0187664 A2    7/1986

OTHER PUBLICATIONS

Zeylikovich, I. et al. "Nonmechanical grating-generated scanning coherence microscopy". Optics Letters, vol. 23, No. 23, Dec. 1, 1998, pp. 1797-1799.*

* cited by examiner

Primary Examiner — Michael A Lyons
(74) Attorney, Agent, or Firm — Rosenberg, Klein & Lee

(57) ABSTRACT

The present invention relates to an apparatus for low coherence optical imaging, and more particularly to an apparatus for low coherence optical imaging which can obtain the information of the different depths of a sample simultaneously. The apparatus comprises a phase transformation unit or a beam shift unit. The phase transformation unit or beam shift unit transforms and reflects the reference light, such that the reflected reference light comprises different phases at the different positions of a cross-section. When the reference light and a information light from the sample are superimposed on a photo detector, the information of the different depths of the sample is obtained. By using the apparatus of the present invention, the elements, the volume, and the cost of the apparatus are reduced. Because of only two-dimensional scanning is required, the scanning rate is improved.

5 Claims, 6 Drawing Sheets

APPARATUS FOR LOW COHERENCE OPTICAL IMAGING

CROSS REFERENCE TO RELATED APPLICATIONS

This application is a Divisional of co-pending application Ser. No. 12/841,745, filed on Jul. 22, 2010, and for which priority is claimed under 35 U.S.C. §120; and this application claims priority of Application No. 099109291 filed in Taiwan on Mar. 29, 2010 under 35 U.S.C. §119, the entire contents of all of which are hereby incorporated by reference.

FIELD OF THE INVENTION

The present invention relates to an apparatus for low coherence optical imaging, and more particularly to an apparatus for low coherence optical imaging which can obtain the information of the different depths of a sample simultaneously.

BACKGROUND OF THE INVENTION

Optical Coherence Tomography (OCT) is a technique of optical imaging developed recently. It is based on the technique of Optical Coherence Domain Reflectometry (OCDR). The output of a low coherence light source comprises temporal coherence, which interferes in an interferometer and forms interference patterns. According to the interference patterns, an image of the sample can be obtained.

The longitudinal resolution of the image is proportional to the bandwidth of the light source with equation: $1_c = 0.441 \times (\lambda_0^2/\Delta\lambda)$.

Wherein, $1_c$ is the coherence length of the light source namely the longitudinal resolution of the image. $\lambda_0$ Is the center wavelength of the light source, and $\Delta\lambda$ is the bandwidth of the light source.

Theoretically, the wider the bandwidth of the light source is, the shorter the interference patterns are, and the higher the resolution of the image is.

OCT is a technique that can obtain the 3-dimensional high resolution image of a sample. Wherein, the technique of OCDR is used to have the longitudinal resolution, and a combination of lenses is used to raise the transverse resolution of the image.

Referring to FIG. 1, there is shown an interferometer configuration in accordance with the traditional OCT technique. A light beam 121 from a low coherence light source 12 is collimated by a collimating lens 141 and then input into a beam splitter 14. The light beam 121 is split to a sample light 123 and a reference light 125.

The sample light 123 is focused to a sample 17 by a focusing lens 143. A portion of the sample light 123 is reflected or scattered by the sample 17 and collimated by the focusing lens 143 then reflected by the beam splitter 14 and focused to an image sensor 181 by a focus lens 147. According to the difference of the light paths of the sample light 123 and the reference light 125, interference patterns are formed on the image sensor 181. By using a signal processor 183 to analyze the signal detected by the image sensor 181, the information of the sample can be shown on a display 185.

Furthermore, there is a longitudinal scanning unit 161 driving the mirror 145 to move up and down for adjusting the light path of the reference light 125, and the longitudinal scan (in depth) of the sample can be achieved. A transverse scanning unit 163 is used to drive the sample light 123 to scan on the surface of the sample 17 in 2 transverse dimensions.

SUMMARY OF THE INVENTION

It is an objective of the present invention to provide an apparatus for low coherence optical imaging, and more particularly to an apparatus for low coherence optical imaging which can obtain the information of the different depths of a sample simultaneously.

It is another objective of the present invention to provide an apparatus for low coherence optical imaging comprising a phase transforming unit to transform a light beam to have different phases at different position of a cross-section. Thus, the information of the different depths of a sample can be obtained when interference patterns are formed by the reference light and the information light.

It is another objective of the present invention to provide an apparatus for low coherence optical imaging, wherein the phase transforming unit is a microstructure mirror.

It is another objective of the present invention to provide an apparatus for low coherence optical imaging, wherein the microstructure mirror is an optical grid.

It is another objective of the present invention to provide an apparatus for low coherence optical imaging comprising a beam shifting unit and a beam bending unit for shifting the reference light and bending it to superpose with the information light.

It is another objective of the present invention to provide an apparatus for low coherence optical imaging, wherein the beam shifting unit comprises at least one focusing element and at least one reflecting element, wherein the at least one focusing element could be a lens and the at least one reflecting element could be a mirror.

It is another objective of the present invention to provide an apparatus for low coherence optical imaging, wherein the lens is a gradient-index lens.

It is another objective of the present invention to provide an apparatus for low coherence optical imaging, wherein the beam bending unit is a prism.

The present invention provides an apparatus for low coherence optical imaging, comprising: an optical source for providing a low coherence light beam; a main beam splitter for splitting the light beam to a sample light and a reference light, wherein the sample light is projected to a sample, and a portion of the sample light is reflected or scattered by the sample to form an information light, wherein the information light is directed to a photo detector by the main beam splitter; a phase transforming unit for reflecting the reference light to the photo detector and transforming the reference light to have different phases at different positions of a cross-section, wherein the reference light and the information light are superposed to form interference patterns on the photo detector; and a signal processing unit electrically coupled to the photo detector for analyzing the spatial information of the sample.

The present invention further provides an apparatus for low coherence optical imaging, comprising: an optical source for providing a low coherence light beam; a main beam splitter for splitting the light beam to a sample light and a reference light, wherein the sample light is projected to a sample, and a portion of the sample light is reflected or scattered by the sample to form an information light; a beam shifting unit for reflecting and shifting the reference light away from the original light path; a beam bending unit for bending the reflected and shifted reference light and the information light directed by the main beam splitter to a photo detector, wherein the reference light and the information light are superposed to form interference patterns on the photo detector; and a signal processing unit electrically coupled to the photo detector for analyzing the spatial information of the sample.

DETAILED DESCRIPTION OF DISCLOSED EMBODIMENTS

Figure 1:
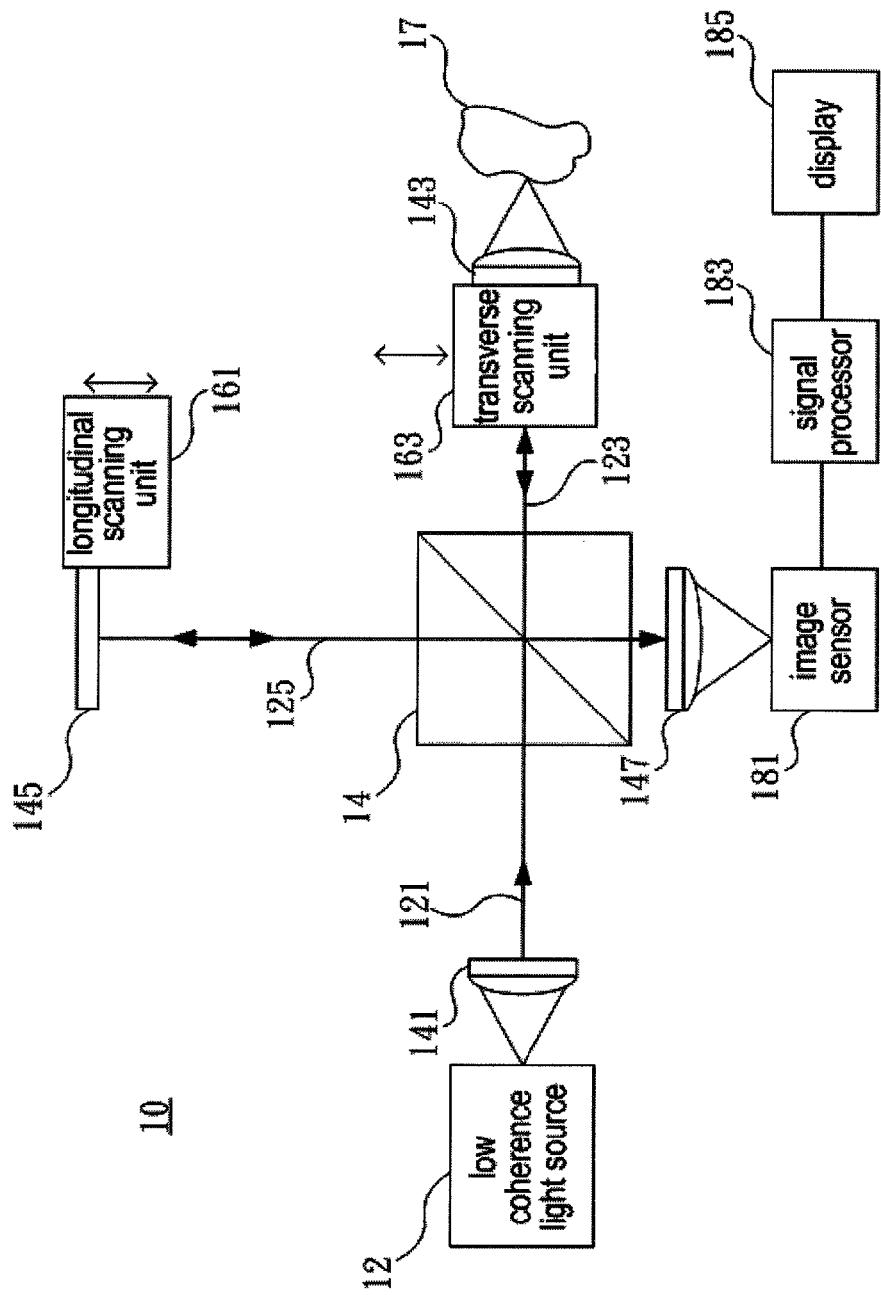
FIG. 1 is a schematic diagram of an interferometer configuration in accordance with the traditional OCT technique.
Figure 2:
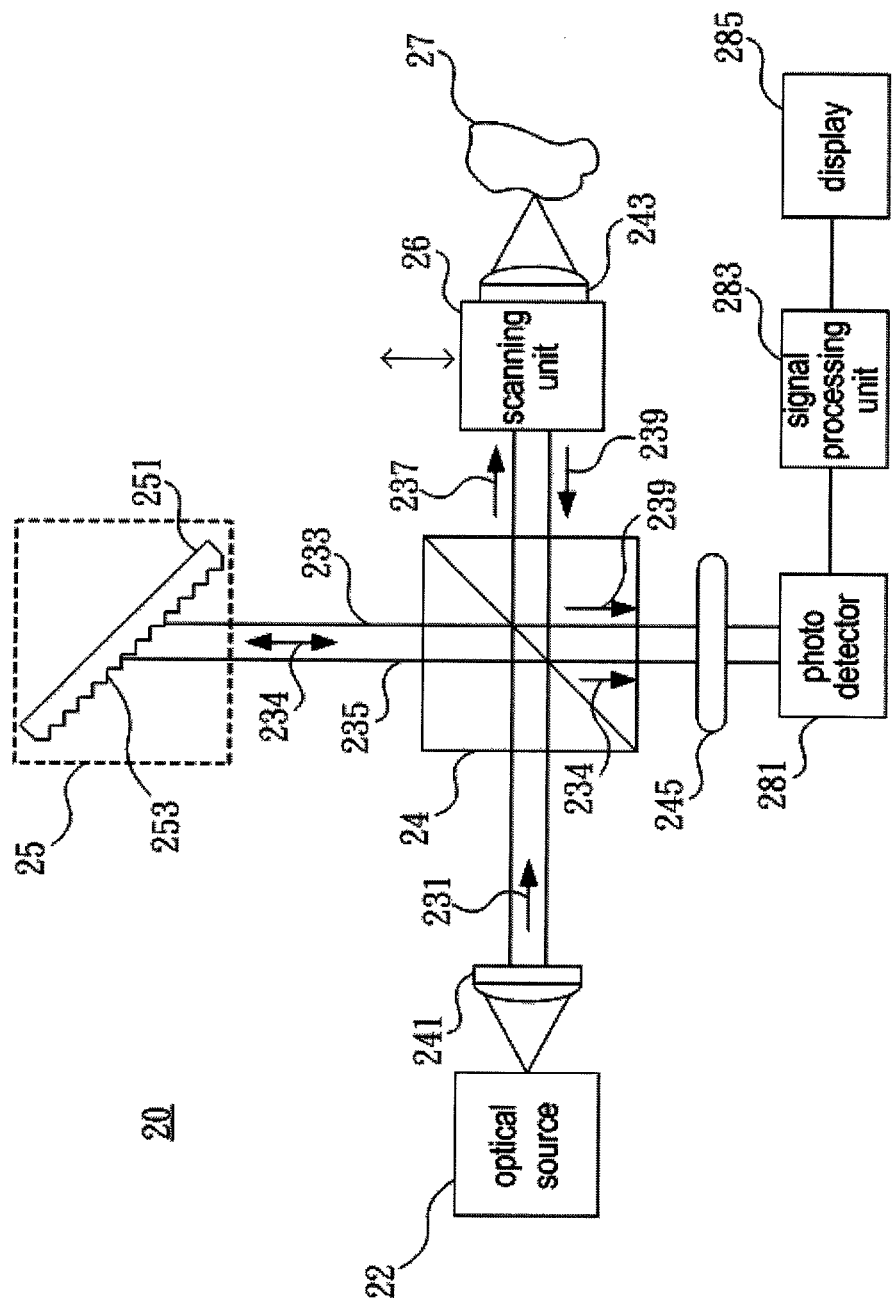
FIG. 2 is a schematic diagram of an apparatus for low coherence optical imaging in accordance with one embodiment of the present invention.

Referring to FIG. 2, there is shown a schematic diagram of an apparatus for low coherence optical imaging in accordance with one embodiment of the present invention. The apparatus for low coherence optical imaging 20 comprises an optical source 22, a main beam splitter 24, a phase transforming unit 25, a sample 27, a photo detector 281, and a signal processing unit 283.

A low coherence light beam 231 provided by the optical source 22, is projected to the main beam splitter 24, and split into a reference light 234 and a sample light 237. The sample light 237 is projected to the sample 27, and a portion of the sample light 237 is reflected or scattered by the sample 27 to form an information light 239. The information light 239 is reflected to the photo detector 281 by the main beam splitter 24. The reference light 234 is reflected to the photo detector 281 by the phase transforming unit 25. The phases of the one side 233 and the other side 235 of the reflected reference light 234 are different.

In one embodiment of the present invention, the phase transforming unit 25 is a microstructure mirror 251 with microstructures 253 that duplicate periodically, such as an optical grid. In the configuration of the embodiment, microstructures 253 are set apart in different distances to the main beam splitter 24, such that the reference light 234 reflected by the microstructures between the one side 233 and the other side 235 comprises different light paths and phases.

The reflected reference light 234 and the information light 239 will be superposed to form interference patterns on the photo detector 281. Because the reflected reference light 234 comprises different phases, it interferes with the information light 239 from different depths of the sample 27 constructively. The photo detector 281 generates a signal that represents the interference patterns and transmits the signal to the signal processing unit 283 for analyzing the spatial information of the sample 27. And then the information of the sample 27 can be shown on the display 285.

In one embodiment of the present invention, the apparatus for low coherence optical imaging 20 further comprises a scanning unit 26 disposed between the main beam splitter 24 and the sample 27 for driving the sample light 237 to scan transversely on the surface of the sample 27.

The apparatus for low coherence optical imaging 20 further comprises a collimating element 241, a focusing element 243, and a one-dimensional focusing element 245. The collimating element 241 is disposed to collimate the light beam 231 outputted from the optical source 22. The focusing element 243 is used to focus the sample light 237 on the sample 27 and collimate the information light 239. The one-dimensional focusing element 245 focuses the reference light 234 and the information light 239 on the photo detector 281 in one dimension.

Figure 3:
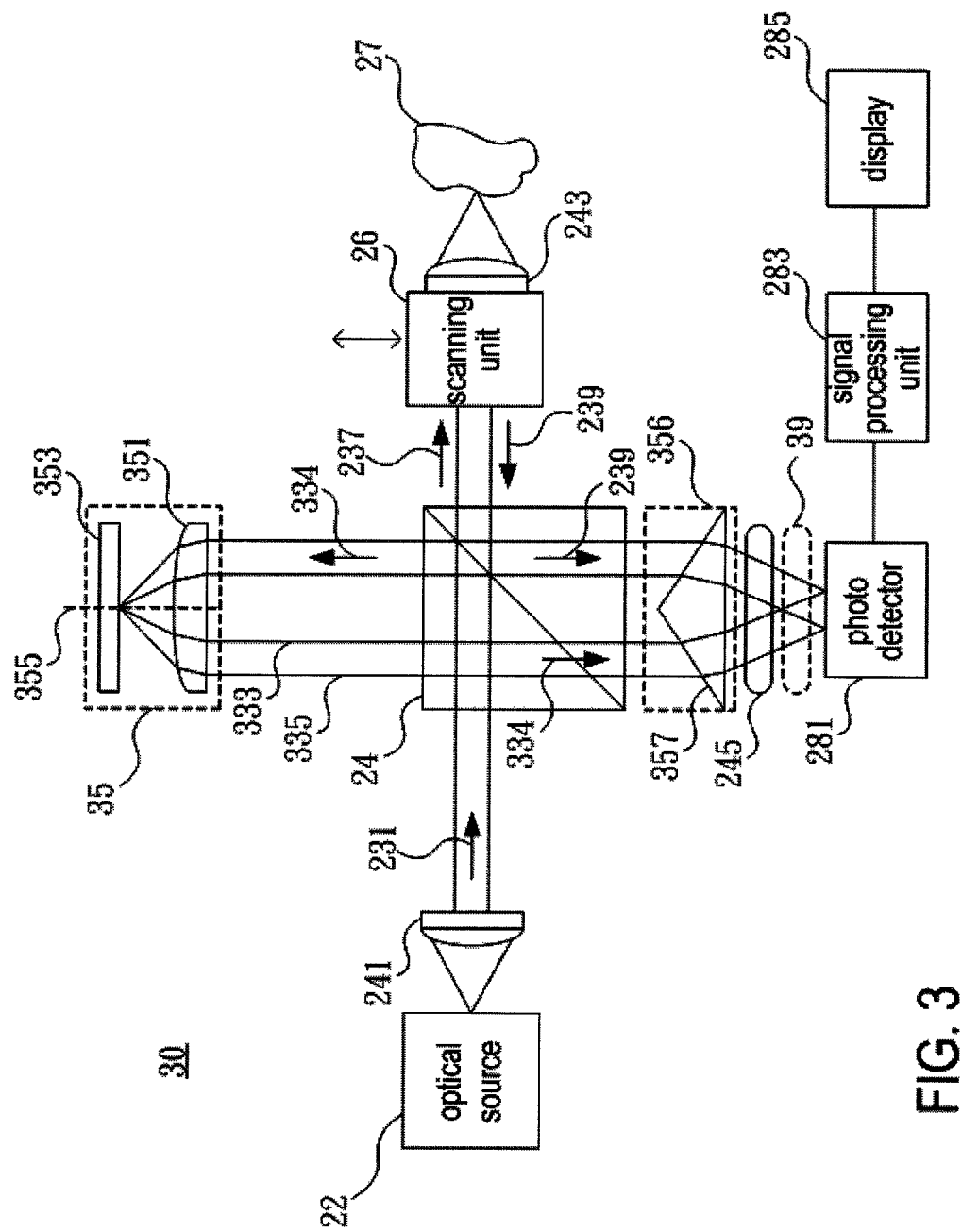
FIG. 3 is a schematic diagram of an apparatus for low coherence optical imaging in accordance with another embodiment of the present invention.

Referring to FIG. 3, there is shown a schematic diagram of an apparatus for low coherence optical imaging in accordance with another embodiment of the present invention. The apparatus for low coherence optical imaging 30 is almost the same as the embodiment shown in FIG. 2. The apparatus 30 comprises a beam shifting unit 35 instead of the phase transforming unit 25, and a beam bending unit 356 for bending the reference light 334 and the information light 239 to superpose on the photo detector 281.

The beam shifting unit 35 comprises at least one focusing element and at least one reflecting element, wherein the at least one focusing element could be a lens 351 (e.g. a radial gradient index lens) and the at least one reflecting element could be a mirror 353. The reference light 334 passes through the lens 351, and is reflected by the mirror 353, and then passes through the lens 351 again. The inner side 333 and the outer side 335 of the reference light 334 are bended with different angle. Thus the phases and light paths of the inner side 333 and the outer side 335 of the reference light 334 are different. In the present embodiment, we configure that the light path of the inner side 333 shorter than the light path of the outer side 335.

Since the reflected reference light 334 is shifted away from the original light path, the beam bending unit 356 is used to bend the reference light 334 and the information light 239 to be superposed on the photo detector 281. Because the reference light 334 comprises difference phases, it interferes with the information light 239 from different depths of the sample 27 constructively. The photo detector 281 generates a signal that represents the interference patterns and transmits the signal to the signal processing unit 283 for analyzing. Then the information from different depths of the sample 27 can be shown on the display 285.

The lens 351 is preferably a radial gradient index (GRIN) lens, and the beam bending unit 356 can be embodied by a prism 357, wherein the information light 239 and the reference light 334 are bended by passing respectively through the prism 357 without overlapping each other simultaneously, and then superposed on the optical detector 281.

In one embodiment of the present invention, the apparatus 30 further comprises a one-dimensional focusing element 245 disposed between the beam bending unit 356 and the photo detector 281 for focusing the reference light 334 and the information light 239 on the photo detector 281 in one dimension. The photo detector 281 of the present embodiment is a one-dimensional photo detector array.

Furthermore, the apparatus 30 further comprises a one-dimensional defocusing element 39 disposed between the one-dimensional focusing element 245 and the beam bending unit 357 or between the one-dimensional focusing element 245 and the photo detector 281. The defocusing dimension of the one-dimension defocusing element 39 is configured to be perpendicular to the focusing dimension of the one-dimensional focusing element 245. Such that the focus range of the reference light 334 and the information light 239 on the photo detector 281 is enlarged. This is helpful for improving the longitudinal scanning region.

Figure 4:
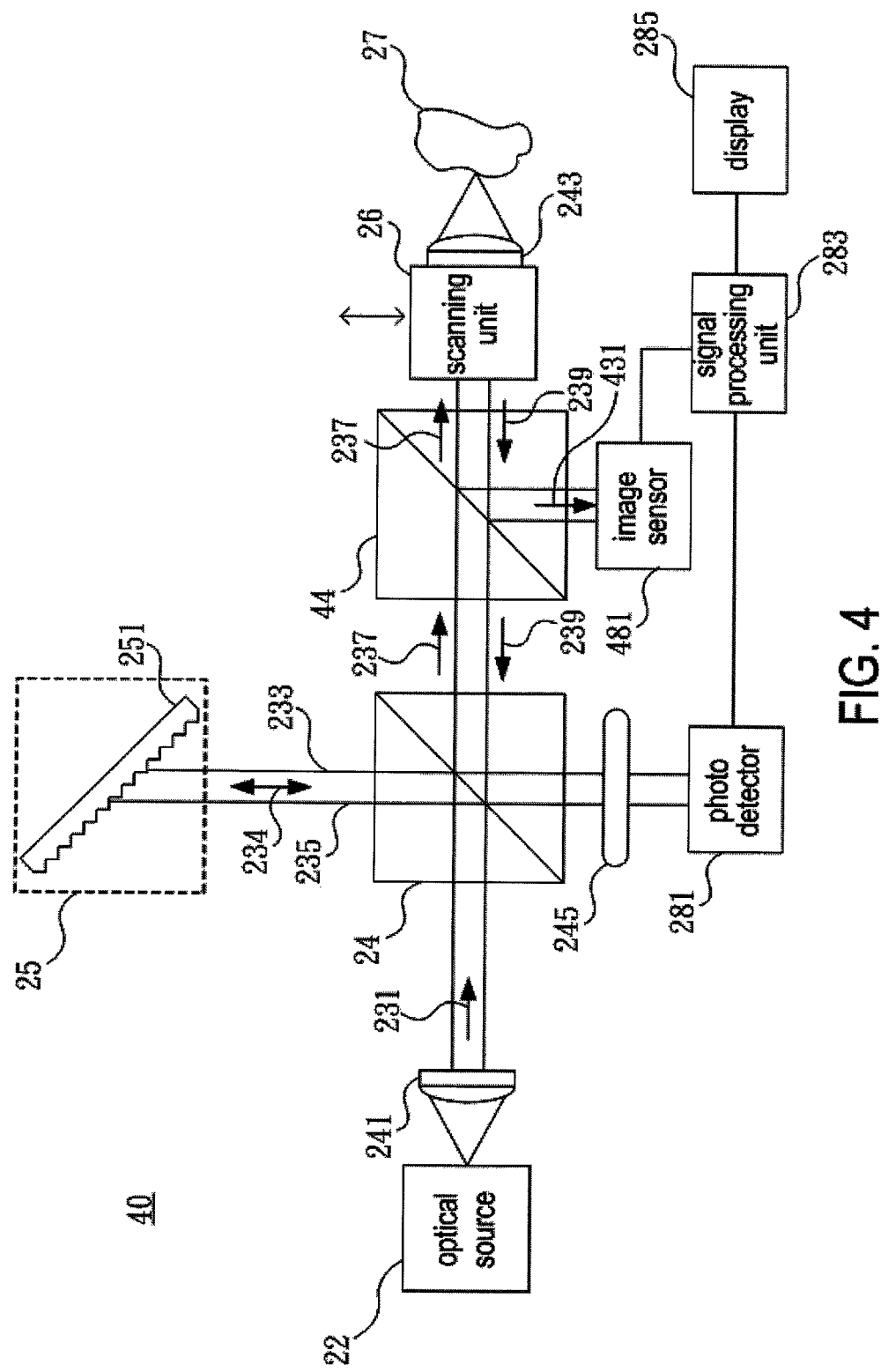
FIG. 4 is a schematic diagram of an apparatus for low coherence optical imaging in accordance with another embodiment of the present invention.

Referring to FIG. 4, there is shown a schematic diagram of an apparatus for low coherence optical imaging in accordance with another embodiment of the present invention. The apparatus 40 of the present embodiment is almost the same as the embodiment shown in FIG. 2. The apparatus 40 of the present embodiment comprises a second beam splitter 44 and an image sensor 481. The second beam splitter 44 is disposed between the main beam splitter 24 and the sample 27. The image sensor 481 is connected to the signal processing unit 283.

The second beam splitter 44 is configured to split an observation light 431 from the information light 239. The observation light 431 is projected to the image sensor 481. The image sensor 481 generates and transmits an image signal to the signal processing unit 283. And then the image of the surface of the sample 27 can be shown on the display 285.

Figure 5:
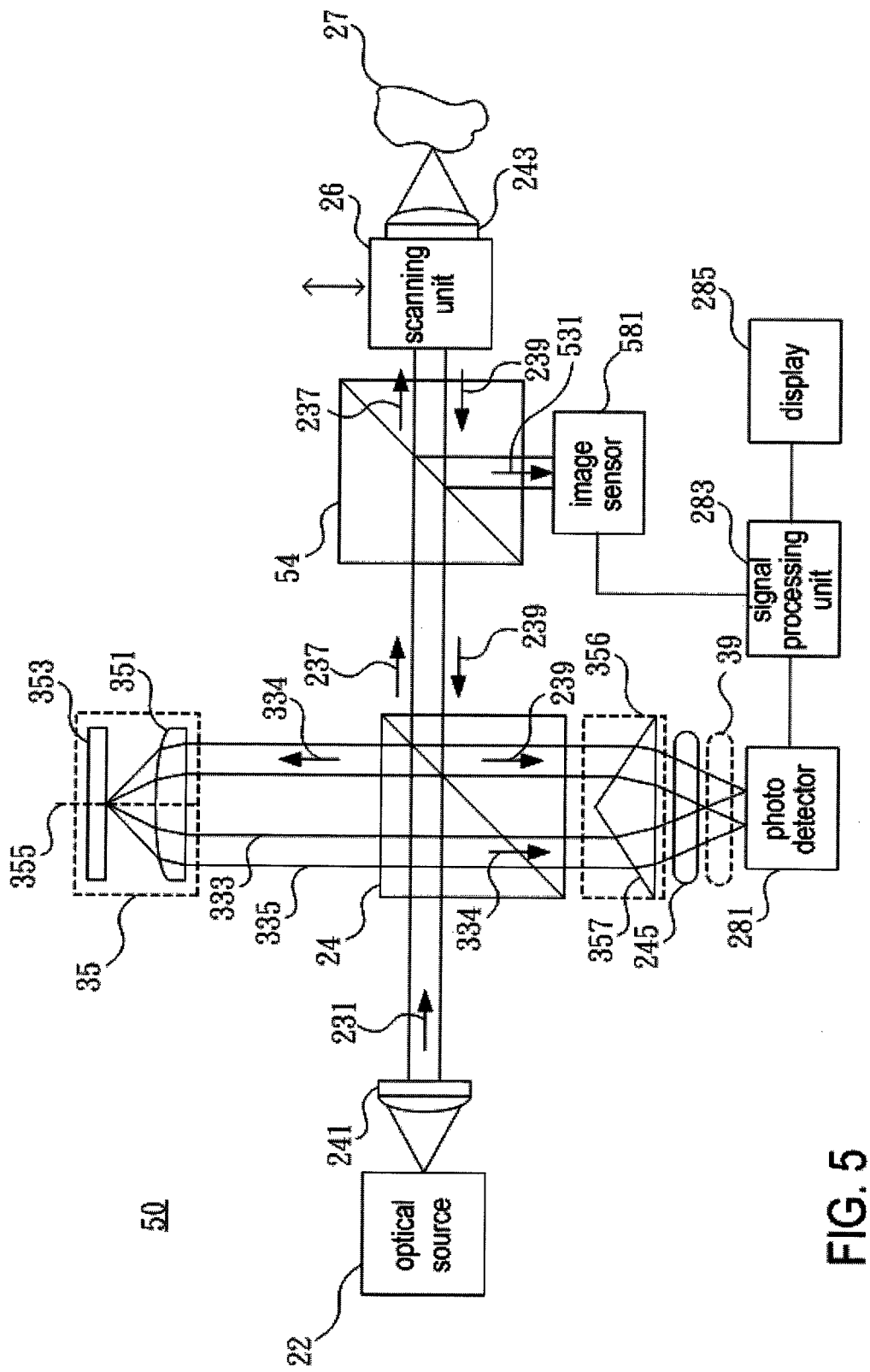
FIG. 5 is a schematic diagram of an apparatus for low coherence optical imaging in accordance with another embodiment of the present invention.

Referring to FIG. 5, there is shown a schematic diagram of an apparatus for low coherence optical imaging in accordance with another embodiment of the present invention. The apparatus 50 of the present embodiment is almost the same as the embodiment shown in FIG. 3. The apparatus 50 of the present embodiment comprises a second beam splitter 54 and an image sensor 581. The second beam splitter 54 is disposed between the main beam splitter 24 and the sample 27. The image sensor 481 is connected to the signal processing unit 283.

The second beam splitter 54 is configured to split an observation light 531 from the information light 239. The observation light 531 is projected to the image sensor 581. The image sensor 581 generates and transmits an image signal to the signal processing unit 283. And then the image of the surface of the sample 27 can be shown on the display 285.

Figure 6:
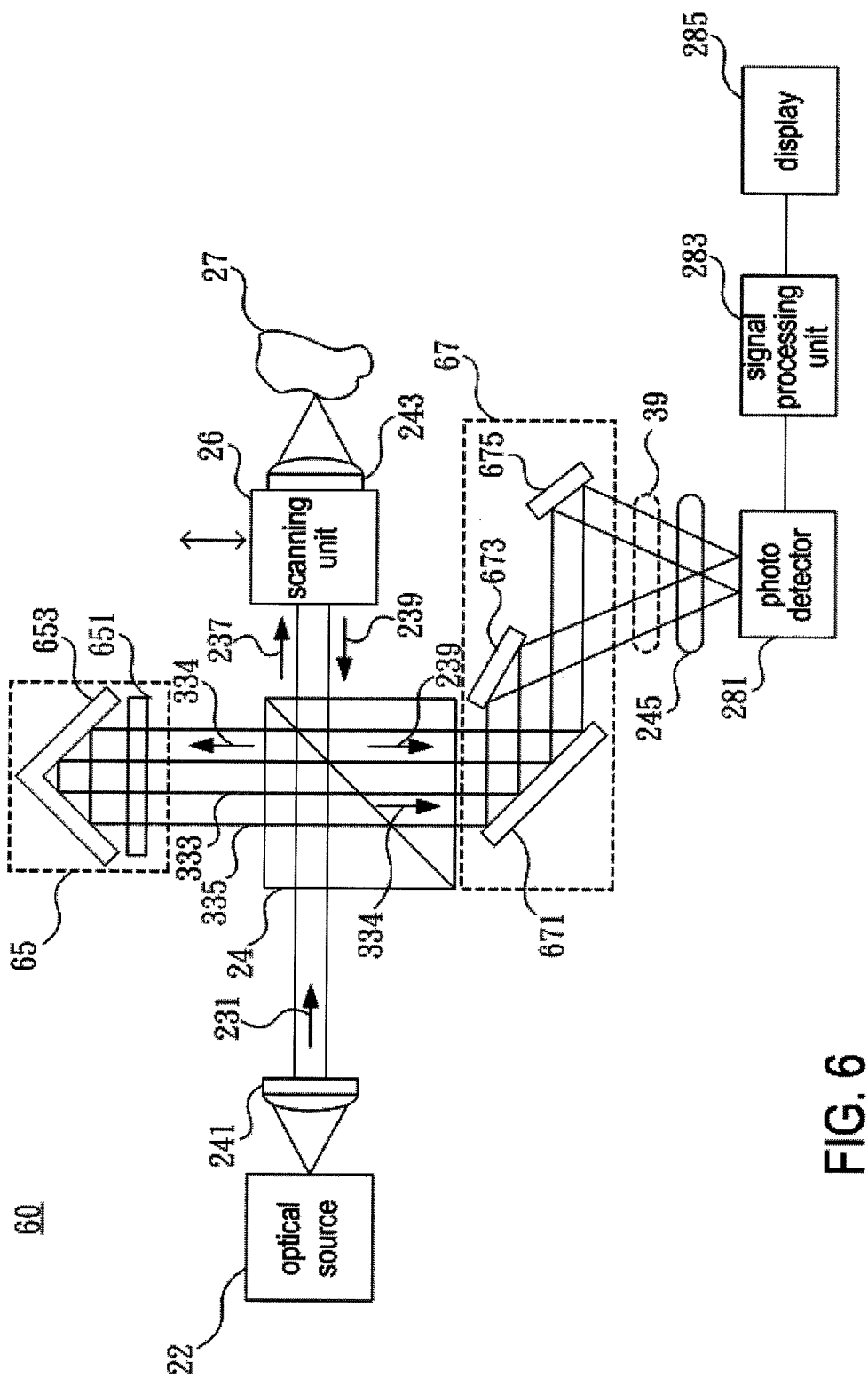
FIG. 6 is a schematic diagram of an apparatus for low coherence optical imaging in accordance with still another embodiment of the present invention.

Referring to FIG. 6, there is shown a schematic diagram of an apparatus for low coherence optical imaging in accordance with another embodiment of the present invention. The apparatus 60 of the present embodiment is almost the same as the embodiment shown in FIG. 3, but the beam shifting unit 65 is embodied by a dispersion compensator 651 and a retroreflector 653, and the beam bending unit 67 is embodied by a plurality of reflecting elements (e.g. mirrors).

The plurality of mirrors comprises a first mirror 671, a second mirror 673, and a third mirror 675. The first mirror 671 is used to reflect and redirect the reference light 334 and the information light 239 to the second mirror 673 and the third mirror 675 respectively. The second mirror 673 and the third mirror 675 are configured to reflect the reference light 334 and the information light 239 respectively and superpose them on the photo detector 281.

In the present embodiment, a one-dimensional focusing element 245 is also used to focus the reference light 334 and the information light 239 on the photo detector in one dimension. The photo detector 281 can also be a one-dimensional photo detector array.

Furthermore, the apparatus 60 can further comprise a one-dimensional defocusing element 39 disposed between the beam bending unit 67 and the photo detector 281. And the defocusing dimension of the one-dimensional defocusing element 39 is configured to be perpendicular to the focusing dimension of the one-dimensional focusing element 245. Such that the focus range of the reference light 334 and the information light 239 on the photo detector 281 is enlarged. This is helpful for improving the longitudinal scanning region.

The beam shifting unit 35 and 65 of the embodiments shown in FIG. 3 and FIG. 6 are replaceable for each other. The beam bending unit 356 and 67 are also replaceable for each other.

The present invention is not limited to the above-described embodiments. Various alternatives, modifications and equivalents may be used. Therefore, the above embodiments should not be taken as limiting the scope of the invention, which is defined by the appending claims.

What is claimed is:

1. An apparatus for low coherence optical imaging, comprising:
   an optical source for providing a low coherence light beam;
   a main beam splitter for splitting the light beam to a sample light and a reference light, wherein the sample light is projected to a sample, and a portion of the sample light is reflected or scattered by the sample to form an information light, wherein the information light is directed to a photo detector by the main beam splitter;
   a phase transforming unit for reflecting the reference light to the photo detector and transforming the reference light to have different phases at different positions of a cross-section, said phase transforming unit being a microstructure mirror, said microstructure mirror being an optical grid, wherein the reference light and the information light are superposed to form interference patterns on the photo detector; and
   a signal processing unit electrically coupled to the photo detector for analyzing the spatial information of the sample.

2. The apparatus of claim 1, further comprising a display electrically coupled to the signal processing unit for displaying the information of the sample.

3. The apparatus of claim 2, further comprising:
   a second beam splitter disposed between the main beam splitter and the sample for splitting a observation light from the information light; and
   an image sensor electrically coupled to the signal processing unit for receiving the observation light, generating an image signal, and transmitting the image signal to the signal processing unit.

4. The apparatus of claim 1, further comprising a scanning unit for driving the sample light to scan on the surface of the sample.

5. The apparatus of claim 1, further comprising:
   a collimating element for collimating the light beam from the optical source;
   a focusing element for focusing the sample light on the sample and collimating the information light; and
   a one-dimensional focusing element for focusing the reference light and the information light on the photo detector in one dimension.

\* \* \* \* \*